J. S TOAN.
Corn Planter

No. 16,410.

Patented Jan. 13, 1857.

UNITED STATES PATENT OFFICE.

JOHN S. TOAN, OF VENICE, NEW YORK.

IMPROVEMENT IN CORN-PLANTERS.

Specification forming part of Letters Patent No. 16,410, dated January 13, 1857.

*To all whom it may concern:*

Be it known that I, JOHN S. TOAN, of Venice, in the county Cayuga and State of New York, have invented a new and useful Improvement in Corn-Planters; and I do hereby declare that the following is full, clear, and exact description of the same, reference being had to the accompanying drawings, forming part of this specification, in which—

Figure 1:
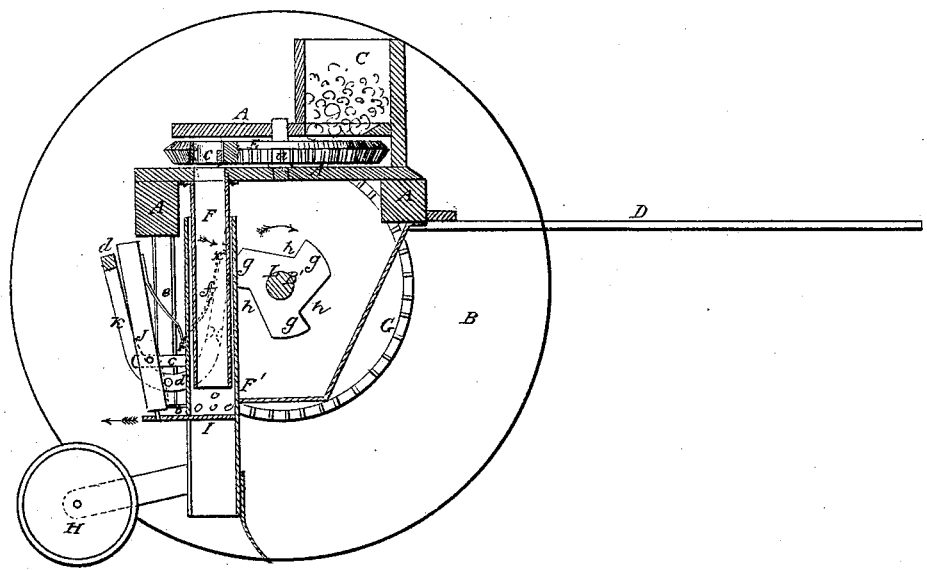
Figure 2:
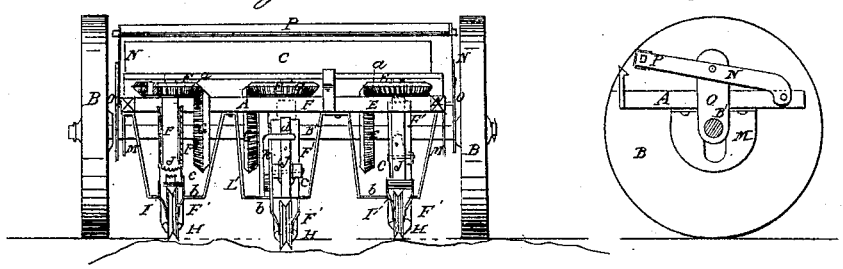
Figure 3:
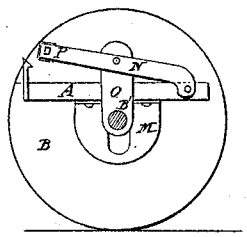

Figure 1 is an end view of a corn-planter constructed after my invention. Fig. 2 is a vertical longitudinal section of the same. Fig. 3 is a similar section through the line $x\,x$ in Fig. 1.

Similar letters of reference in each of the several figures indicate corresponding parts.

To enable others skilled in the art to make and use my invention, I will proceed to describe its construction and operation.

A represents the frame of the planter. It is of the ordinary construction, and arranged upon two wheels, B B, and provided with a seed-hopper, C, and shafts or tongue D.

E E E are the distributing-plates arranged under the hopper C and over the planting-tubes F F F F' F' F', as shown. These plates are provided with bevel-teeth $a\,a\,a$ on their under side, and gear into bevel-wheels G G G on the axle B' of the propelling-wheels, and are caused to revolve thereby and carry seed from the hopper to the planting-tubes, as shown in Fig. 1, each plate depositing seed once, twice, or thrice into the tubes at every revolution of the axle.

Each of the planting-tubes is made in two parts, F F'. The part F is attached fast to the frame A, while the part F' fits loosely over F and is capable of moving up and down, so that it may accommodate itself to the unevenness of the soil, as illustrated in Fig. 2, and thus avoid stoppage or breakage. This portion of the planting-tube is prevented from falling too low or separating from F by stops $b\,c$, the lower one of which serves as a portion of the frame-brace A' and the upper one as a support for a valve, hereinafter referred to. H H H represent the grooved covering-rollers, attached to the end of the movable portion of the planting-tubes, and rising and falling with said tubes, and thus made to accommodate themselves to the surface of the soil, and consequently perfectly cover the grain. Thus making the planting-tubes in two parts avoids making them flexible, and the corn is consequently planted more regularly.

I represents a valve arranged horizontally at the lower end of the loose portion of the planting-tube, as shown. This valve is for confining the seed in said part of the the tube after being dropped by the distributing-plates until the proper time for depositing it into the soil. By thus confining the seed all danger of scattering is avoided, and the seed will be planted near together in a hill, which, as may be well known, is among farmers a very important desideratum. The valve I is attached to a swinging piece, J, which is hung on the stop $c$ and made to extend up some distance, so as to stand in front of the end $d$ of a U-shaped lever, K, which has its fulcrum at $d'$. The swinging piece J is kept in place and steadied by a light spring, $e$, and is caused to open the valve by the end $d$ of said U-shaped lever exerting pressure against it, which pressure is caused by a strong spring, $f$, acting against the end $d^2$ of the U-shaped lever, as clearly shown in the drawings. This valve is kept closed and allowed to open at stated intervals—say once, twice, or thrice during the revolution of the driving-wheels—by a cam, L, which is on the axle B' and revolves with it, it closing the valve when one of its longest portions $g\,g\,g$ bears against the end $d^2$ of the U-shaped lever, and allowing it to open when one of its spaces $h\,h\,h$ comes opposite end $d^2$ of said lever.

From the foregoing description it will be apparent that the machine in its general aspect resembles many others for the same purpose, and of necessity many of the devices which I employ are common to other corn-planting machines, such as the distributing of the seed by the plate-wheels E from the hopper into the depositing-tubes, the making of the depositing or planting tubes in two parts, one or the lower of which parts fits loosely over the other, and has free rise and fall to conform to varying inequalities of the ground, rise over obstructions, and so forth, the mere employment of a seed-discharging valve in the planting-tube, and the providing the planting-tube at its bottom in front with a shovel or plow-bit; also, the mere attachment to the machine of grooved covering-rollers following in rear of the planting-tubes, and in many other respects is the similarity to other machines borne out in this; but, nevertheless, there is an important difference, and this difference constitutes my improvement, which relates to the secondary valve arrangement in the lower part of the sliding portion of the planting-tube and the rigid attachment of the covering-roller to said sliding lower portion of the planting-tube in rear of it, acting in combination with the shovel or plow, but (shown in Fig. 1) in front of it.

The secondary valve I, arranged and operating as described, not merely serves to secure close planting of the several grains deposited at a time in distinction to the scattering of the seed, which takes place where an upper valve only is used (especially in shallow planting) by the long drop of the corn, its striking the sides of the tube and rebounding or flying off to different sides near the bottom; but the secondary valve being in the sliding portion of said tube, a regular and easy drop of the grain from a fixed altitude is secured, whatever the inequalities of the ground, and the said secondary valve I, opening backward, aids, in addition to the lowness of the drop, better to secure the escape of the corn free from rebounding contact with the sides of the tube, while it is all important for the easy and perfect operation of this secondary sliding valve I that it should preserve as nearly as possible, a horizontal position, and neither it or its operative gear bind during its several actions as it is raised or lowered by the rising and lowering of the sliding portion of the planting-tube in traveling over unequal ground; and thus is it necessary that the sliding portion F′ of the tube should play perpendicularly in distinction to moving curvilinearly, which latter, too, has a bad vibratory and irregular effect in depositing the seed; and, also, desirable or necessary for the free and equal operation of said valve that the lever J and its fulcrum, which forms the immediate gear operating the valve, should, as well as the valve I, be connected with the same and form part of the sliding portion F′ of the tube, which is the case here. To secure this free and perfect operation of the secondary valve I, as well as to secure the easy action of the sliding portion F′ of the tube in rising perpendicularly and prevent its binding in the part which serves to guide it during the forward travel of the planter over unequal ground, I attach the covering-roller H rigidly to the lower sliding portion of the planting-tube, in the wake or rear of it, so that said roller not merely serves to cover the seed in the most regular and perfect manner during the rising and falling of the tube, and in exact relationship to said movements of the tube, and not simply serves to raise the tube in traveling over rising ground, as is the case in a patented arrangement of a roller (not acting as a coverer) attached to one side of the tube, but the arrangement of this covering-roller in the rear, and attached rigidly to the sliding tube, acting in combination with the plow or shovel bit in front of said sliding tube or portion F′, gives what is equivalent to a broad base or bearing, extending both back and in front of the tube, so that the lift of the tube in traveling over rising ground is effected both by roller and plow-bit from either side, (back and front,) and said sliding portion F′ of the tube, with its valve and valve appurtenances, raised easily and perpendicularly, or thereabout, without binding, which would not be done were the roller on the side of the tube.

In order to throw the tubes out of operation when it is desirable to do so, the axle B′ of the planter is hung in slotted plates M M and connected to levers N N by links O O, said levers being united together by a cross-piece, P, and, by laying hold of which and pushing down, the axle is elevated and the tubes thrown out of operation; but such arrangements are common, and my improvement, as previously set forth, does not relate to this portion of the planter.

I do not claim as new the general construction and operation of the machine, and am aware that many of the devices here employed have before been used, as herein specified; but What I do claim as new and useful herein, and desire to secure by Letters Patent, is—

The combination and arrangement for operation together, substantially as shown and described, of the lower sliding tube, F′, having a plow-bit in front and covering-roller rigidly attached to it in the rear, with the secondary cross-sliding valve I and its operative lever J, arranged to form part of said sliding tube F′, the whole being supported by the covering-roller and plow-bit, for the more perfect and easy operation of the secondary valve and sliding tube, as herein specified.

JOHN S. TOAN.

Witnesses:
CYRENUS WHEELER, Jr.,
ASA STOURD.